US006961237B2

(12) United States Patent
Dickie

(10) Patent No.: US 6,961,237 B2
(45) Date of Patent: Nov. 1, 2005

(54) PORTABLE COMPUTER WITH INTEGRATED PDA I/O DOCKING CRADLE

(75) Inventor: James P Dickie, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/887,756

(22) Filed: Jul. 9, 2004

(65) Prior Publication Data

US 2004/0268005 A1 Dec. 30, 2004

Related U.S. Application Data

(63) Continuation of application No. 09/906,180, filed on Jul. 16, 2001, now Pat. No. 6,798,647.

(51) Int. Cl.[7] .......... G06F 1/16

(52) U.S. Cl. .......... 361/683; 361/686; 710/15; 345/158

(58) Field of Search .......... 361/683–686, 361/680–682, 724–727; D6/397, 396; D14/100–114; 710/1, 15, 72, 17, 100–103; 360/97.8; 298/65, 298/118, 918, 118.1, 118.3; 345/1.1, 173, 345/903, 905, 158, 168; 341/20–22; 429/99

(56) References Cited

U.S. PATENT DOCUMENTS

| | | | |
|---|---|---|---|
| 3,407,869 | A | 10/1968 | Staunton |
| 4,241,380 | A | 12/1980 | Lehmann et al. |
| 4,519,016 | A | 5/1985 | Bradley et al. |
| 4,850,657 | A | 7/1989 | Placke et al. |
| 5,237,486 | A | 8/1993 | LaPointe et al. |
| 5,243,493 | A | 9/1993 | Jeng et al. |
| 5,272,593 | A | 12/1993 | Jakob et al. |
| 5,297,025 | A | 3/1994 | Shouquist et al. |
| 5,313,362 | A | 5/1994 | Hatada et al. |
| 5,557,500 | A | 9/1996 | Baucom et al. |
| 5,559,675 | A | 9/1996 | Hsieh et al. |
| 5,600,538 | A | 2/1997 | Xanthopoulos |
| 5,612,852 | A | 3/1997 | Leaverault et al. |
| 5,661,630 | A | 8/1997 | Levins et al. |
| 5,671,120 | A | 9/1997 | Kikinisi |
| 5,677,830 | A | 10/1997 | Nogus et al. |
| 5,726,864 | A | 3/1998 | Copeland et al. |
| 5,751,550 | A | 5/1998 | Korinsky |
| 5,774,330 | A | 6/1998 | Melton et al. |
| 5,784,256 | A | 7/1998 | Nakamura et al. |
| 5,793,957 | A | 8/1998 | Kikinis et al. |
| 5,812,373 | A | 9/1998 | Hwang |
| 5,816,673 | A | 10/1998 | Sauer et al. |
| 5,835,343 | A | 11/1998 | Johns et al. |

(Continued)

FOREIGN PATENT DOCUMENTS

| | | |
|---|---|---|
| JP | 408101816 | 4/1996 |

(Continued)

OTHER PUBLICATIONS

Article "Personal Computer Structure Designed for Robotized Manufacturability", IBM Technical Disclosure Bulletin, Aug. 1987, US, vol. 30, Issue 3, pp. 1253-1255.

*Primary Examiner*—Michael Datskovsky

(57) ABSTRACT

The disclosure relates to computer systems. One example is a portable computer having a housing, a processor and memory mounted within the housing. The portable computer also has a docking cradle integrated into the housing to dock a handheld computing device and to interface the handheld computing device with the processor, the docking cradle having a fixedly movable receiving surface.

15 Claims, 4 Drawing Sheets

U.S. PATENT DOCUMENTS

| | | | |
|---|---|---|---|
| 5,870,485 | A | 2/1999 | Lundgren et al. |
| 5,923,531 | A | 7/1999 | Bachman et al. |
| 5,973,920 | A | 10/1999 | Altic et al. |
| 6,008,986 | A | 12/1999 | Mok |
| 6,015,195 | A | 1/2000 | Anderson et al. |
| 6,028,769 | A | 2/2000 | Zurek |
| 6,049,453 | A | 4/2000 | Hulsebosch |
| 6,049,455 | A | 4/2000 | Nakamura et al. |
| 6,073,187 | A | 6/2000 | Jacobs et al. |
| 6,101,089 | A | 8/2000 | Seto |
| 6,104,451 | A | 8/2000 | Matsuoka et al. |
| 6,115,249 | A | 9/2000 | Cipolla et al. |
| 6,116,767 | A | 9/2000 | Chaiken et al. |
| 6,445,579 | B1 | 9/2002 | Singleton, Jr. |
| 6,538,880 | B1 | 3/2003 | Kamijo et al. |
| 6,584,533 | B1 | 6/2003 | Cho et al. |
| 6,697,032 | B2 | 2/2004 | Chitturi et al. |
| 6,697,251 | B1 | 2/2004 | Aisenberg |
| 2002/0091877 | A1 | 7/2002 | Karidis |
| 2002/0103951 | A1 | 8/2002 | Huber et al. |
| 2002/0140627 | A1 | 10/2002 | Ohki et al. |
| 2003/0126335 | A1 | 7/2003 | Silvester |

FOREIGN PATENT DOCUMENTS

| | | |
|---|---|---|
| WO | WO 95/25308 | 9/1995 |

PORTABLE COMPUTER WITH INTEGRATED PDA I/O DOCKING CRADLE

RELATED CASES

This patent application is a continuation claiming priority from a patent application having Ser. No. 09/906,180 titled "Portable Computer with Integrated PDA I/O Docking Cradle" filed Jul. 16, 2001, and issued as U.S. Pat. No. 6,798,647.

BACKGROUND

With the increased mobility of people in today's workforce, the demand for mobile computing and communication capabilities outside of the office has increased dramatically. Those inside the office, as well as those who typically work outside the office, often require the ability to communicate with others and other devices to access or transfer various data files. In response to this demand, handheld computing devices such as personal digital assistants (PDAs) have been developed.

A PDA is a compact device that can serve various functions including a cellular phone, facsimile transmitter, personal organizer, and the like. PDAs typically include a stylus and/or a touch screen for user input, and may include a keyboard or a limited number of input keys. PDAs can be used for such things as sending and retrieving e-mail, Web browsing, and data-sharing applications over the Internet, intranet or corporate networks.

Because of the compact nature of PDAs, the ability to enter data is somewhat limited. Touch screens and miniature keypads typically provide a single character hunt-and-click entry technique that is slow and not conducive to entering large amounts of data. PDAs have not replaced more traditional portable computers when it comes to such tasks as data entry, word processing, spreadsheet analysis, and so on. As a result, today's computer users often opt to carry both devices, a PDA to hold such things as appointments, tasks, and contact information, as well as a portable computer to accommodate more data intensive operations, such as word processing, spreadsheet functionality, and so on.

Dual device users typically enter events into either the PDA or the portable computer and then synchronize the two devices so that both contain the same information. Today, a PDA is most commonly interfaced with a portable computer by connecting an external cradle or cable to the computer and then plugging the PDA into the cradle or cable. Another technique is to utilize a wireless connection (e.g., IR, RF, etc.) to interface the two computing devices.

This invention offers another technique for interfacing a PDA with a portable computer.

BRIEF DESCRIPTION OF THE DRAWINGS

The same numbers are used throughout the drawings to reference like features and components.

DETAILED DESCRIPTION

A computing system includes a handheld computing device (e.g., a personal digital assistant (PDA), cellular phone, etc.) and a portable computer with an integrated docking cradle to dock the handheld computing device. The docking cradle physically stores the handheld computing device, facilitates data communication between the device and the portable computer, and supplies power to the handheld computing device. When docked, the handheld computing device can be safely stored and ported with the portable computer and can synchronize event data (e.g., calendar, appointments, etc.), email, and other information with the portable computer.

The computing system is described in the context of a laptop computer with an integrated docking cradle adapted to dock a PDA. In particular, one type of PDA is illustrated for discussion purposes, although other types of PDAs may be used. PDAs are constructed in many different shapes and sizes, as well as with different functionality (e.g., personal organizer, browser, cellular phone, facsimile transmitter, etc.). Additionally, the computer may be configured to dock other types of portable handheld computing devices, such as pagers and cellular phones.

Figure 1:
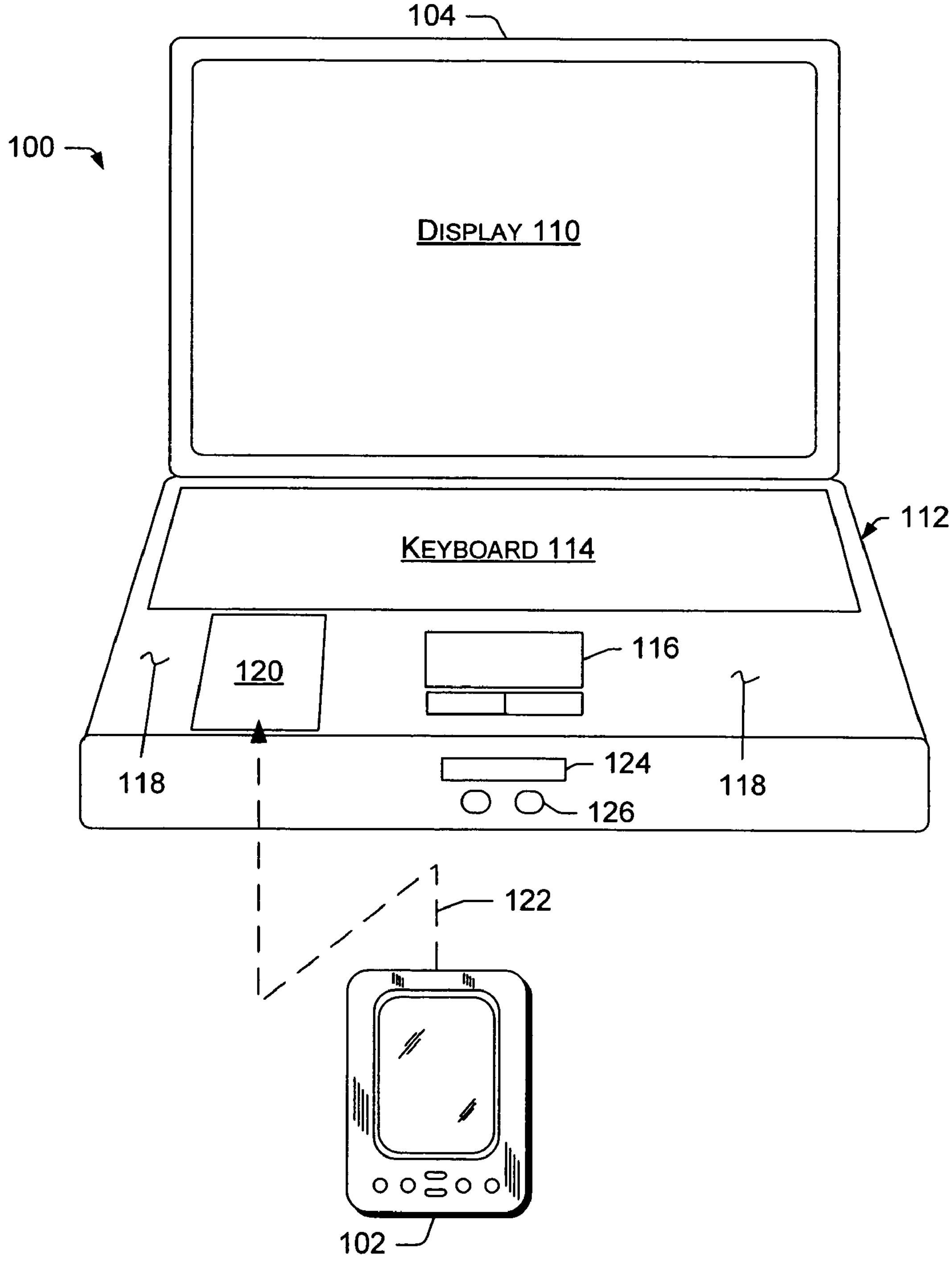
FIG. 1 illustrates a personal digital assistant (PDA) separate from, but dockable within, a portable computer.

FIG. 1 illustrates an exemplary computing system 100 composed of a personal digital assistant (PDA) 102 and a portable computer 104 (e.g., laptop, notebook, etc.). The portable computer 104 includes a display 110 mounted in a lid that is connected via a hinge to a body 112 to move between an open position (as shown) and a closed position where the display lid is folded onto the body 112. The body 112 houses a keyboard 114 and a mouse/touch pad entry mechanism 116. The body 112 also defines a palm rest 118 juxtaposed with the keyboard 114 and straddling the mouse/touch pad entry mechanism 116.

A PDA docking cradle 120 is integrated into the palm rest 118 to dock the PDA 102. The PDA docking cradle 120 may be located on either side of the mouse/touch pad entry mechanism 116, although it is shown on the left-side palm rest for purposes of illustration. The PDA 102 can be selectively docked within, or undocked from, the PDA docking cradle 120 as represented by the dashed arrow 122.

A status display 124 is provided externally on the front side of the body 112. The status display 124 provides events and other notifications that are generated by the PDA when it is docked in the cradle 120. In this manner, the status display 124 can provide the user with relevant and timely information, even if the portable computer is in a suspend mode and the display lid 110 is closed, thereby enclosing the PDA. One or more buttons 126 are positioned near the status display 124. These buttons 126 are used to acknowledge or modify events and information generated by the PDA 102 and/or the portable computer 104 and presented on the status display 124.

Figure 2:
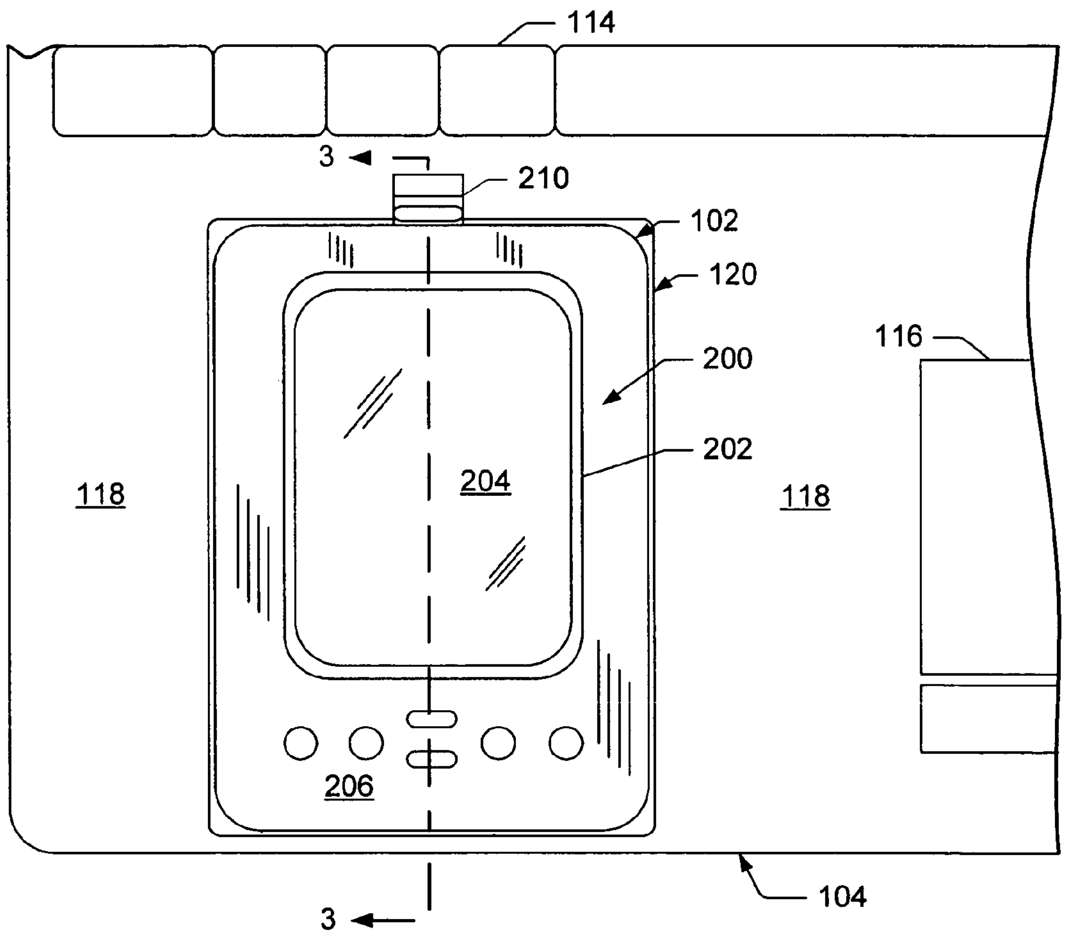
FIG. 2 illustrates the PDA docked within a cradle that is integrated into a palm rest of the portable computer.

FIG. 2 shows an enlarged view of the PDA 102 when it is docked within the PDA docking cradle 120. The PDA 102 includes a housing 200 that defines a display area 202 with a touch screen 204. Various user-engagable buttons 206 enable a user to interact with the PDA. The user can use either buttons 206 to make various menu selections that are displayed on the touch screen 204, or physically contact the touch screen directly with a finger or stylus (not shown).

A release latch 210 latches the PDA 102 into the docking cradle 120. The portable computer 104 physically stores and protects the PDA 102 when docked so that the user can easily carry both the portable computer 104 and PDA 102. The docking cradle is also in a memorable location that allows the user to readily locate the PDA when the user wishes to undock the PDA and carry it separately from the computer. When the PDA 102 is docked in the cradle 120, the PDA 102 is approximately flush with the palm rest 118, thereby providing a continuous surface on which the user of the portable computer 104 can rest his/her palm when operating the keyboard 114 and/or mouse pad 116.

In addition to physically mounting the PDA 102, the PDA docking cradle 120 provides an interface that supports both data communication and power resources. In this manner, the integrated PDA docking cradle 120 offers the cradle functionality to interface the PDA 102 with the portable computer 104, thereby eliminating the need for external docking cradles. When docked, the PDA 102 is able to communicate with the portable computer 104, via either direct electrical coupling or other means (e.g., proximity coupling, IR coupling, RF coupling, etc.). The PDA 102 and portable computer 104 can exchange data to synchronize various information, such as appointments, email, contacts, and so on. Additionally, power may be supplied to charge a battery resident at the PDA 102.

Both the PDA 102 and the computer 104 can be operational at the same time. Alternatively, one of the devices may be operational without the other. The PDA's input mechanism (e.g., buttons 206, touch screen 204, etc.) are exposed when docked to allow the user to enter data while the PDA 102 is mounted in the docking cradle 120.

Figure 3:
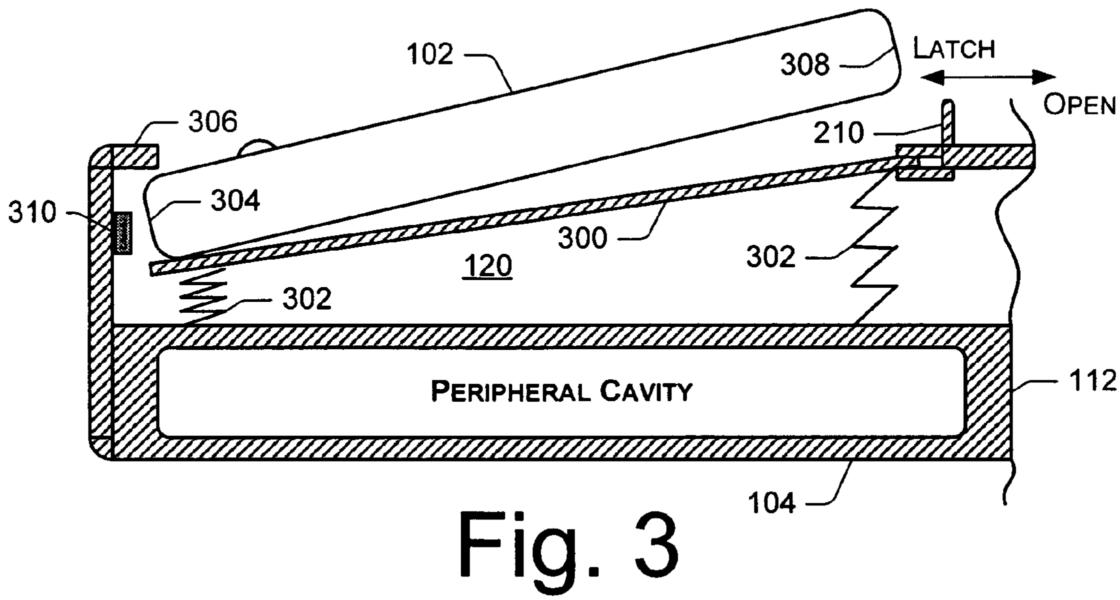
FIG. 3 is a cross-sectional view of the PDA being alternately docked or undocked from the portable computer.

FIG. 3 illustrates one exemplary implementation of docking the PDA 102 into the docking cradle 120. Before the PDA 102 is docked in the portable computer 104, a movable platform 300 is positioned within an opening of the docking cradle 120 to form part of the palm rest. The platform 300 is pressed into this opening via springs 302 (or other biasing mechanisms) and securely held in place by the release latch 210. The release latch 210 is movable between an open position "Open" and a latched position "Latch", with a spring bias toward the latched position.

When the user wishes to dock the PDA 102, the user slides the latch 210 toward open position "Open", which releases the platform 300. The user slides a first end 304 of the PDA 102 under the housing lip 306 into the PDA docking cradle 120, displacing the platform 300 away from the opening. The PDA 102 is then rotated down into the docking cradle, with the release latch 210 being returned to the latched position "Latch" to hold a second end 308 of the PDA 102 in place. The PDA 102 is physically held in the docking cradle by the housing lip 306 and latch 210. In this state, the PDA 102 is safely stored and can be easily ported together with the portable computer 102.

When mounted within the docking cradle, the PDA's first end 304 physically engages, and/or electrically couples to, one or more electrical contacts 310. Electrical contacts exposed on the first end of the PDA (not shown) transfer data to the contacts 310 of the docking cradle. In other implementations, other non-contact couplings may be employed. For example, an IR transceiver may be installed at the PDA's first end 304 to communicate with an IR transceiver provided inside the computer housing. RF transceivers may also be used to interface the PDA and the computer.

Figure 4:
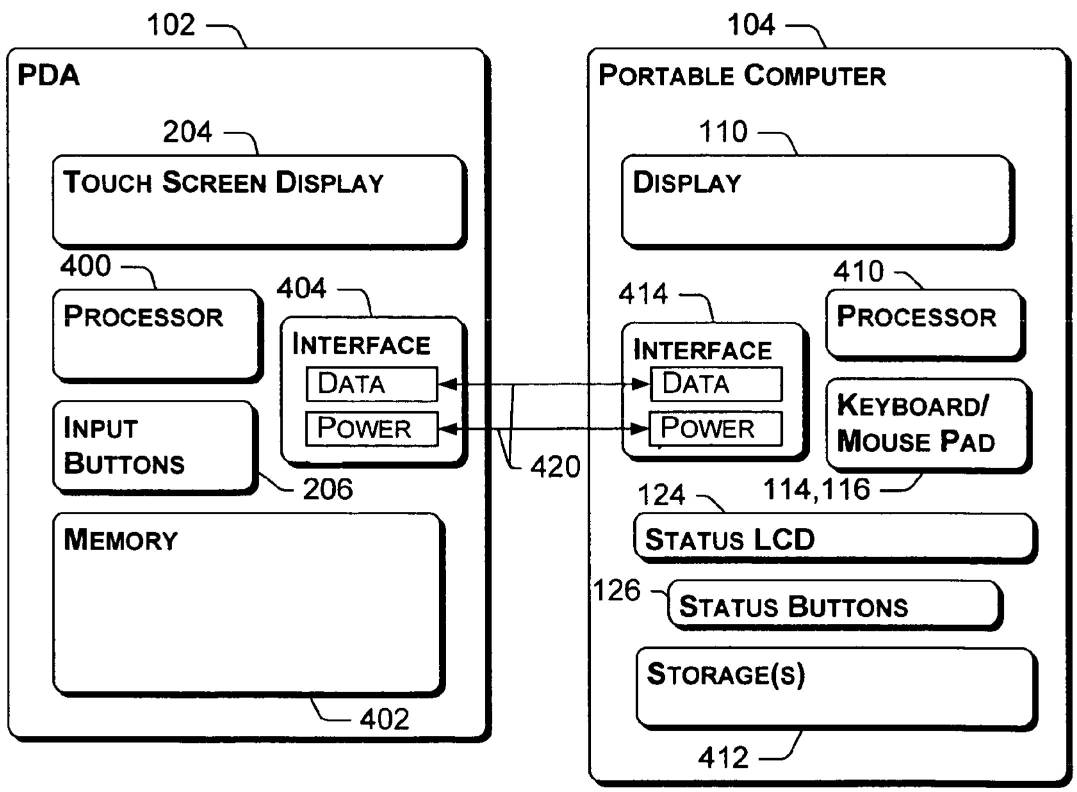
FIG. 4 is a block diagram of selected functional components of the PDA and portable computer.

FIG. 4 shows functional components of the PDA 102 and portable computer 104. The PDA 102 includes a processor 400, memory 402 (e.g., RAM, ROM, Flash, etc.), an interface 404, the touch screen display 204,and the input buttons 206. The portable computer 104 includes a processor 410, one or more storages 412 (e.g., RAM, ROM, hard disk, floppy disk, CD-ROM, DVD, etc.), an interface 414, the display 110, the keyboard 114, the mouse pad 116, and the status LCD 124.

When the PDA 102 is docked in the palm-rest docking cradle 120, the PDA communicates with the portable computer via a communication path 420 between the two interfaces 404 and 414. The interfaces 404 and 414 support both data communication and power transfer. In one implementation, the interfaces facilitate serial communication, although the interfaces may be configured to support parallel communication.

When both devices are powered on, the user can enter data into either device, and the devices automatically synchronize any relevant data between both devices. For instance, if the user enters new contact information into the PDA while it is docked, the PDA will share the new contact information with the contact management software executing on the portable computer. In this way, both devices are kept current, alleviating the user from entering the information twice.

Events, notifications, or other information generated by the PDA 102 may be passed to the portable computer 104 via the communication path 420. The portable computer transfers the PDA-generated information to an embedded controller that displays the information on the status LCD 124. Since very little energy is used, the information may be transferred and displayed while the main processor 410 is in suspend mode. In this way, a user may be reminded or informed of upcoming events even if the portable computer is suspended and the display lid is closed whereby the user cannot see the PDA.

As an example, suppose the PDA generates an event pertaining to an upcoming meeting. The PDA transfers this event to the portable computer via the communication interfaces 404 and 414. The event is then displayed on the status LCD 124 (e.g. "Mgmt Meeting 1:00 PM") to inform the user. Since the status LCD 124 is exposed externally of the portable computer, it may be used to communicate events to the user when the portable computer is folded shut and being carried. If the user wants more information, he/she can then open the portable computer and request more information from the docked PDA. Additionally, the user can utilize buttons 126 to acknowledge or modify the information. These buttons 126 are particularly convenient when the portable computer is closed because the user can handle the event information without opening the portable computer.

Figure 5:
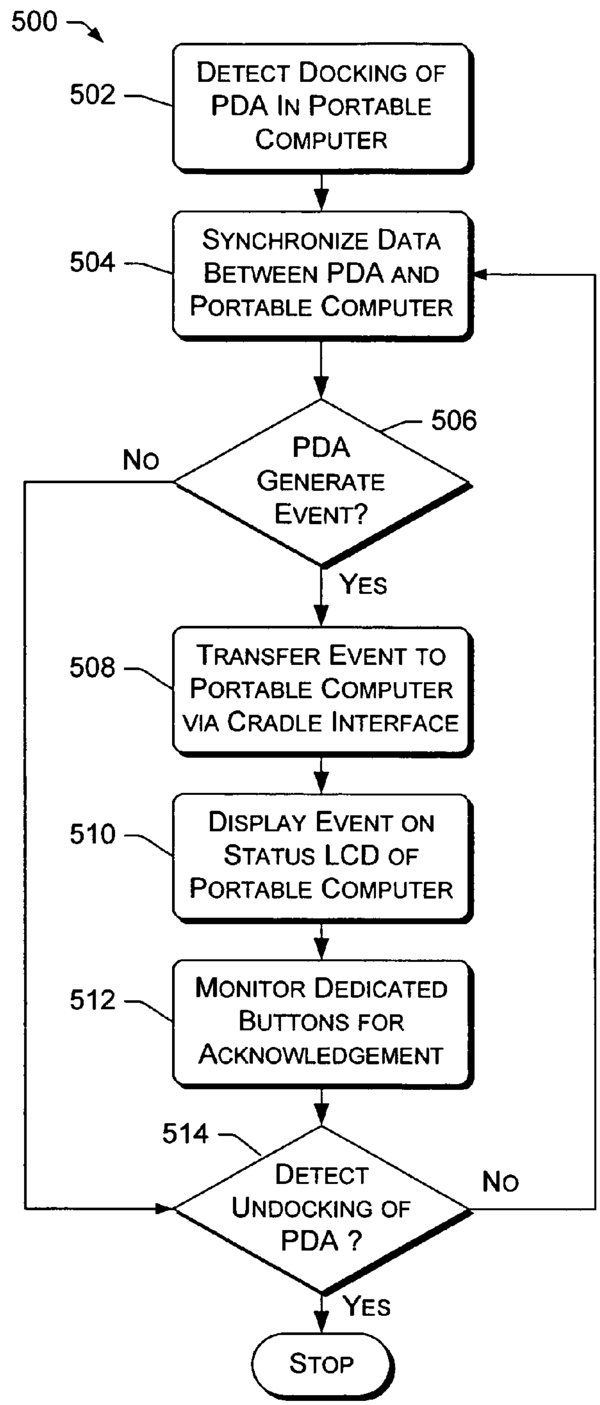
FIG. 5 is a process for operating the PDA while docked in the portable computer.

FIG. 5 shows a process 500 for operating the PDA when docked in the portable computer. Some or all of the operations illustrated as blocks can be implemented in software stored in memory and executed on one or more processors. At block 502, once the PDA is physically mounted in the docking cradle, software executing on the portable computer detects the presence of the PDA. Data is then exchanged between the two devices to synchronize the information residing on each device (block 504). For instance, any new appointments, contacts, emails, etc., that have been received by either device since they were last synchronized are exchanged between the two devices.

At this point, the PDA may remain docked for some time and carried with the computer. The user may enter data into either the PDA or the computer. During this time, the PDA may generate an event, notification, or other information (block 506). When this occurs (i.e., the "yes" branch from block 506), the PDA passes the event to the portable computer (block 508). The portable computer displays the event on the status LCD 124 of the portable computer to inform the user (block 510). The status LCD 124 is viewable even if the portable computer is closed and the user cannot otherwise see the docked PDA. The user may utilize status buttons 126 to acknowledge or modify the event depicted on the status LCD 124. The portable computer monitors for depression or activation of the buttons 126, and handles the response accordingly (block 512).

At block 514, the process detects whether the PDA has been removed from the cradle. If not (i.e., the "No" branch from block 514), the process continues to synchronize any data, entered into one of the devices, with the other device. For instance, the user might enter an event into the PDA while it is docked, and this event is shared with the organization software executing on the portable computer. Once the PDA is detected as being undocked (i.e., the "Yes" branch from block 514), the process ends.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computing system comprising:

a personal digital assistant (PDA); and, a portable computer configured to receive the PDA and comprising a lid portion of a housing pivotably coupled to a body portion of the housing, the portable computer further comprising a first display and a second display, the first display being mounted in the lid such that the first display is visible when the lid is in an open position and blocked when the lid is in a closed position against the body, wherein the second display is mounted on the housing as to be visible at least when the lid is in the closed position, and wherein the second display is configured to display information at least from the PDA.

2. A computing system as recited in claim 1, wherein the portable computer is configured to receive the PDA in a PDA docking cradle and wherein the portable computer further comprises a keyboard mounted in the base portion and a palm rest adjacent to the keyboard, the PDA docking cradle being integrated into the palm rest.

3. A computing system as recited in claim 2, wherein the PDA, when docked in the PDA docking cradle, forms part of the palm rest.

4. A computing system as recited in claim 2, wherein the PDA comprises an input mechanism that is exposed when docked in the PDA docking cradle and the lid portion is in the open position.

5. A computing system as recited in claim 2, wherein the PDA docking cradle comprises an electrical coupling to connect with the PDA when the PDA is docked, the electrical coupling facilitating data communication and supplying power to the PDA.

6. A computing system as recited in claim 2, wherein the portable computer comprises a movable platform movably mounted within the docking cradle to close the docking cradle when the PDA is not docked.

7. A computing system as recited in claim 1, wherein the portable computer further comprises one or more buttons positioned proximally to the second display, the buttons being used to respond to the information displayed on the second display.

8. A portable computer comprising:

a keyboard and a palm rest adjacent the keyboard; and, a docking cradle formed in the palm rest and configured to physically receive a handheld computing device and to facilitate data communication between the handheld computing device and the portable computer, the docking cradle configured such that the palm rest has an elevational profile that is substantially similar in both a presence and absence of the handheld computing device.

9. A portable computer as recited in claim 8 further comprising a movable platform movably mounted within the docking cradle to close the docking cradle when the handheld computing device is undocked.

10. A portable computer as recited in claim 8 further comprising a first display and a second display separate from the first display, the second display being used to display information generated by at least one of the handheld computing device or the portable computer.

11. A portable computer as recited in claim 10 further comprising a body and the first display is operably mounted on the body to move between an open position and a closed position, the second display being mounted externally of the portable computer such that the second display is viewable when the first display is in the closed position.

12. A portable computer as recited in claim 10 further comprising one or more buttons positioned proximally to the second display, the buttons being used to respond to the information displayed on the second display.

13. A computer system, comprising:

a handheld computing device comprising at least a first display and at least one input mechanism; and, a portable computer comprising a keyboard a second display and a third display, the portable computer further comprising a docking station for receiving the hand held computing device; the portable computer having a first open configuration where the first and second displays, the keyboard and the input mechanism are accessible to a user; and a second closed configuration where information from at least the handheld computing device is visible to a user on the third display while the first and second displays are not visible to the user.

14. A portable computer, comprising:

a housing;

a processor and memory mounted within the housing; and, a docking cradle integrated into the housing to dock a handheld computing device and to interface the handheld computing device with the processor, the docking cradle having a receiving surface which is fixedly attached to the housing and which is moveable relative to the housing.

15. A portable computer as recited in claim 14, wherein the docking cradle is mounted in a palm rest of the housing and wherein the receiving surface moves along an axis which extends generally orthogonally the palm rest.

* * * * *